United States Patent [19]

Cheng

[11] Patent Number: 5,019,688

[45] Date of Patent: May 28, 1991

[54] AUXILIARY SOLDERING DEVICE FOR ELECTRIC SOLDER IRON

[76] Inventor: Chuan-Yi Cheng, No. 92, Lane 35, Dong Hsin Road, Keelung, Taiwan

[21] Appl. No.: 410,654

[22] Filed: Sep. 21, 1989

[51] Int. Cl.⁵ .......................... B23K 3/04; H05B 1/00
[52] U.S. Cl. ................................. 219/230; 219/227; 226/128; 228/53
[58] Field of Search ................. 219/230; 228/51–55; 226/128, 129

[56] References Cited

U.S. PATENT DOCUMENTS 2,303,947  12/1942  Moore ............................... 226/128
3,229,885   1/1966  Hurley .............................. 228/52

FOREIGN PATENT DOCUMENTS 1249989  11/1960  France ............................... 228/52

Primary Examiner—Anthony Bartis
Attorney, Agent, or Firm—Poms, Smith, Lande & Rose

[57] ABSTRACT

An auxiliary soldering device for electric solder iron includes a sleeve member fitted to a handle of the iron, a connecting seat disposed on the sleeve member, a first guide pipe located adjacent to a rear end of a connecting seat and a second guide pipe located adjacent to a front end thereof. The second guide pipe extends forward to the tip portion of the electric solder iron permitting a soldering wire to be fed through the guide pipes to the tip portion of the iron. A pressing plate engaging the soldering wire and a vane member are pivoted to the connecting seat with the vane member located above the pressing plate. The vane member has an elastic pushing plate downward extending to abut against the soldering wire, whereby pressing downward the front end of the vane member, the wire is advanced by the pushing plate through a certain distance for soldering use.

1 Claim, 4 Drawing Sheets

AUXILIARY SOLDERING DEVICE FOR ELECTRIC SOLDER IRON

BACKGROUND OF THE INVENTION

An electric solder iron is an indispensable tool in electric parts soldering. When using an electric iron, a solder wire is melted to join electric parts. Therefore, generally, when working, a user must hold the electric solder iron with one hand and grasp the solder wire with the other. As a consequence, the parts being soldered cannot be suitably retained by the user, and thus a great inconvenience is caused. Therefore applicant has developed an auxiliary soldering device for electric solder iron, which enables a user to simultaneously hold the electric solder iron and the solder wire with a single hand, wherein the solder wire is controllably and easily pushed forward for soldering.

SUMMARY OF THE INVENTION

It is a primary object of the present invention to provide an auxiliary soldering device for electric solder iron, which can be fitted to a handle of an electric solder iron. The foregoing object is accomplished by providing an auxiliary soldering device including a vane member, the front end of which is formed with a downward extending pushing plate whereby when pressing the vane member, the pushing plate moves forward a solder wire guided by first and second guide pipes for supplying the solder iron with necessary solder wire during the soldering operation. The present invention can be best understood through the following description with reference to accompanying drawings wherein:

BRIEF DESCRIPTION OF THE DRAWINGS

FIG. 5 is still a view according to. FIG. 3, illustrating the way to remove the soldering wire from the present invention.

DETAILED DESCRIPTION OF THE PREFERRED EMBODIMENT

Figure 1:
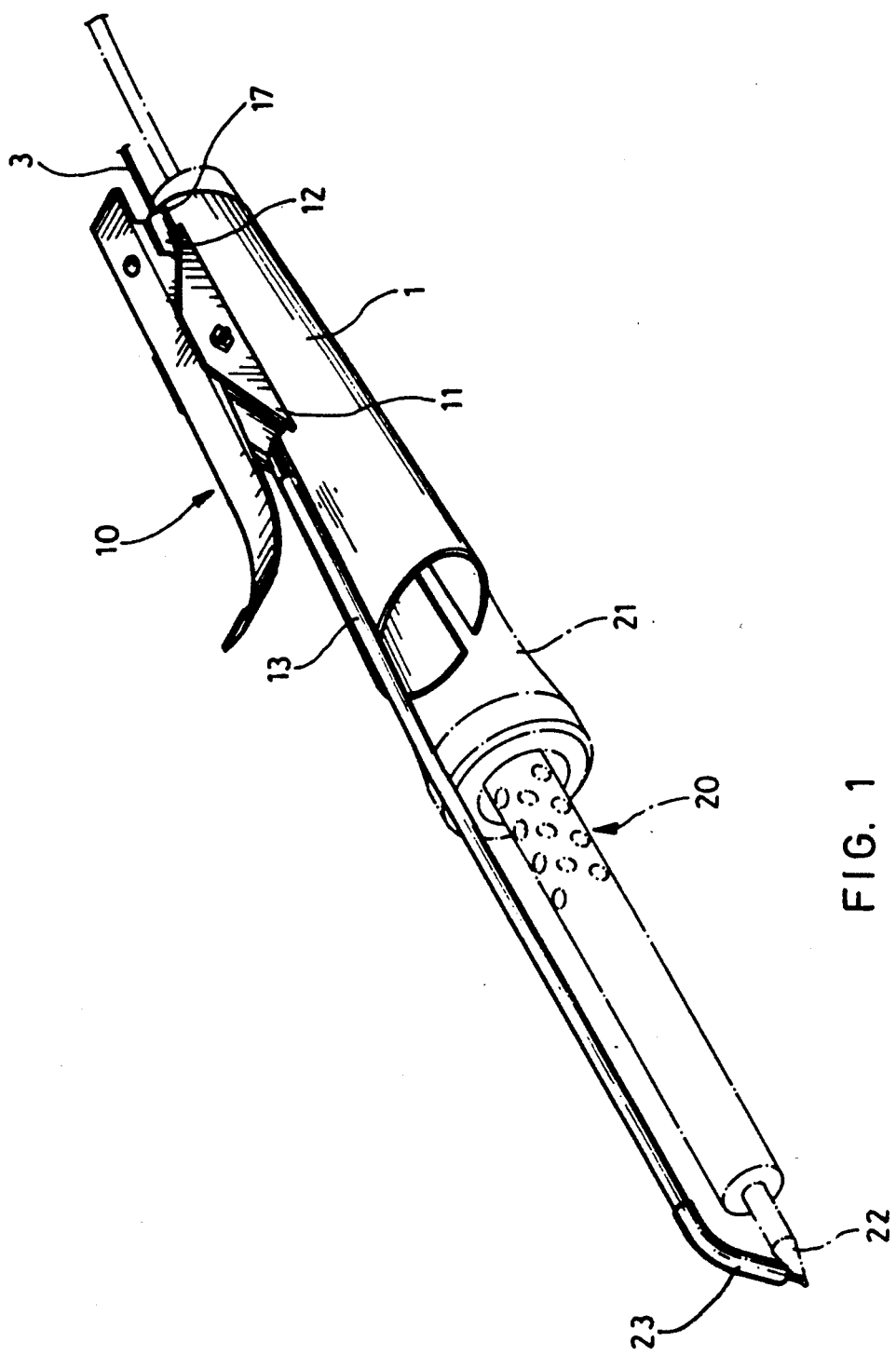
FIG. 1 is a perspective view of the present invention, showing the auxiliary soldering device fitted to a handle of an electric solder iron.
Figure 2:
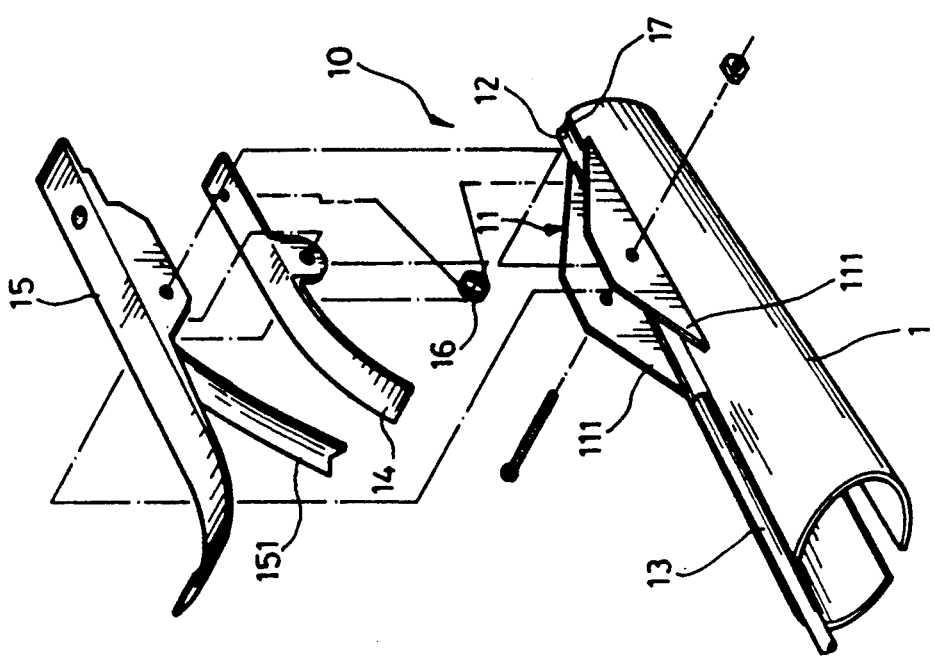
FIG. 2 is an exploded view of the present invention.

Please first refer to FIGS. 1 and 2. The auxiliary soldering device 10 of the present invention includes a sleeve member 1 suitable to be fitted to a handle 21 of an electric solder iron 20, and a connecting seat 11 disposed on the sleeve member 1 and composed of two vertical connecting plates 11. An upper middle portion of the sleeve member 1 is formed with an axial groove 17 with semicircular cross-section. A first guide pipe 12 is disposed at rear end of the connecting seat 11 and a second guide pipe 13 is disposed at front end thereof and extended forward to tip portion 22 of the electric solder iron 20. The first and second guide pipes 12, 13 are located in the groove 17, and a direction bent tube 23 made of thermosetting plastic is rotatable mounted at the front end of the second guide pipe 13, whereby the supplying direction of a solder wire 3 going through guide pipes 12, 13 and reaching tip portion 22 can be adjusted through 360 degree angle according to the requirement of soldering operation.

A pressing plate 14 and a vane member 15 are pivoted to the connecting seat 11 with the vane member 15 located above the pressing plate 14. A spring 16 is disposed between pressing plate 14 and connecting seat 11 to keep the pressing plate 14 and a vane member 15 in a normal horizontal position. The front end of pressing plate 14 extends downward to just contact the soldering wire 3, and the vane member 15 has a pushing plate 151 downward and forward extending to abut against the soldering wire 3 and control the advancing movement thereof. The pushing plate 151 is elastic, permitting the vane member 15 to restore to its original position after pressed.

Figure 3:
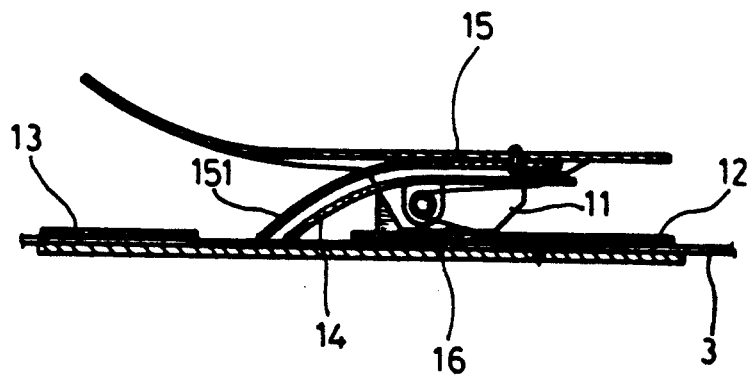
FIG. 3 is a sectional view thereof, showing a soldering wire pressed by the pushing plate in normal condition.
Figure 4:
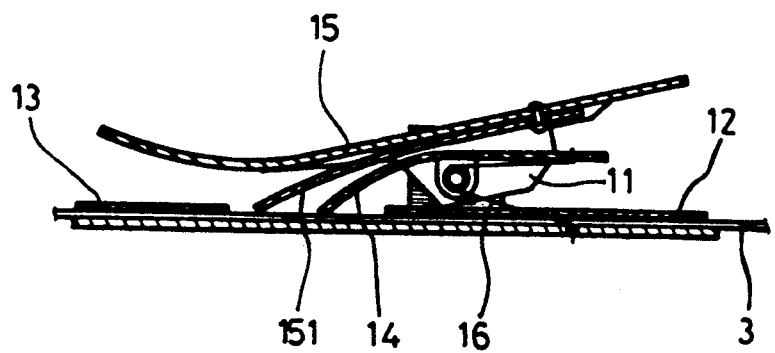
FIG. 4 is a view according to FIG. 3, showing the soldering wire moved forward by the pushing plate.

Please further refer to FIGS. 3 and 4, the solder wire 3 is extended through the first and second guide pipes 12, 13 from rear end of the first guide pipe 12 to be pressed by the pressing plate 14 and pushing plate 151 against the sleeve member 1. When moving the solder wire 3 forward, as shown in FIG. 4, the front end of vane member is pressed downward, making pushing plate 151 engage the solder wire 3 and deform to thereby push the solder wire 3 forward. When the vane member 15 is released, it will return to its home position via the elasticity of pushing plate 151, as shown in FIG. 3. Therefore, each downward press on forward end of the vane member 15 advances the solder wire 3 through a certain distance for soldering use.

Figure 5:
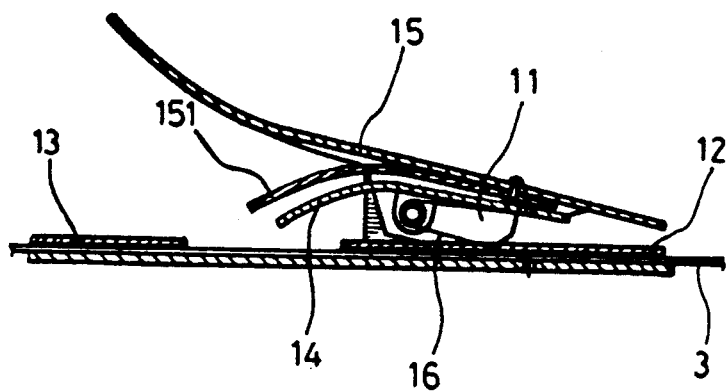

As shown in FIG. 5, if one wants to remove the solder wire 3, he only needs to press the rear end of the vane member 15 downward to thereby separate the pushing plate 151 and pressing plate 14 from the solder wire which can then be easily drawn out. Therefore, the vane member 15 and pressing plate 14 will restore to the horizontal position by means of spring 16.

According to the above arrangement, the solder wire 3 is carried by the electric solder iron 20 via the auxiliary soldering device 10, whereby a user can hold the electric solder iron and advance the soldering wire simultaneously with only one hand. The remaining free hand can thereby work at other tasks, such as retaining electronic parts, etc. As a result, a lot of time and labor can be saved and higher efficiency may be acquired.

I claim:

1. An auxiliary soldering device for an electric solder iron, comprising:

a sleeve member suitable to be fitted to a handle of an electric solder iron and formed with an upper groove, a connecting seat being disposed on said sleeve member and having a front end and a rear end, a first guide pipe being disposed adjacent to said rear end of said connecting seat, a second guide pipe being disposed adjacent to said front end thereof, said second guide pipe adapted to extend to a soldering tip portion of the electric solder iron, a direction bent tube being rotatably mounted at a front end of said second guide pipe to adjust supplying direction of a solder wire going through said first and second guide pipes and said direction bent tubes;

a pressing plate pivotally connected to said connecting seat, said pressing plate having a downward extending front end adapted to contact the solder wire;

a vane pivotally connected to said connecting seat and located above said pressing plate, said vane member having an elastic pushing plate, which is downwardly extending and adapted to abut against the solder wire; and a spring disposed between said pressing plate and connecting seat to keep said pressing plate and vane in a horizontal position, whereby pressing downward a front end of said vane member, said pushing plate thereof is longitudinally flexibly deformed to advance the solder wire through a certain distance, said vane member when released returning to said horizontal position via elasticity of said pushing plate, the pressing downward of the rear end of said vane member, causing said pushing plate and pressing plate to be separated from the solder wire, permitting the solder wire to be drawn out from said auxiliary soldering device.

* * * * *